April 20, 1926.
1,581,205
F. W. HARRIS
PROCESS OF PREVENTING THE PERSISTENCE OF CHAIN FORMATIONS
IN AN ELECTRICAL DEHYDRATOR FOR OIL EMULSIONS
Filed Feb. 11, 1925
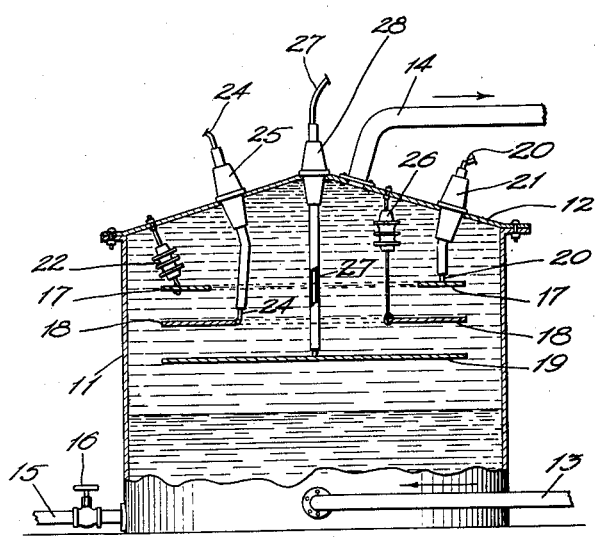
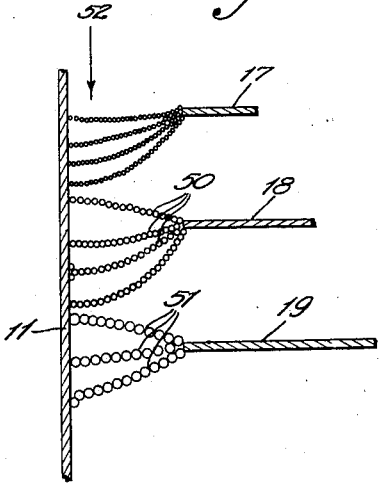
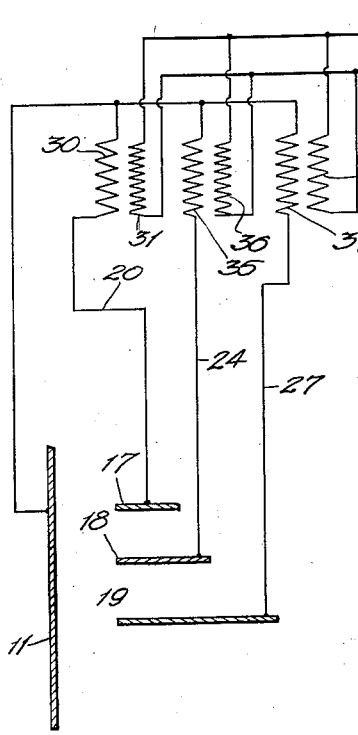
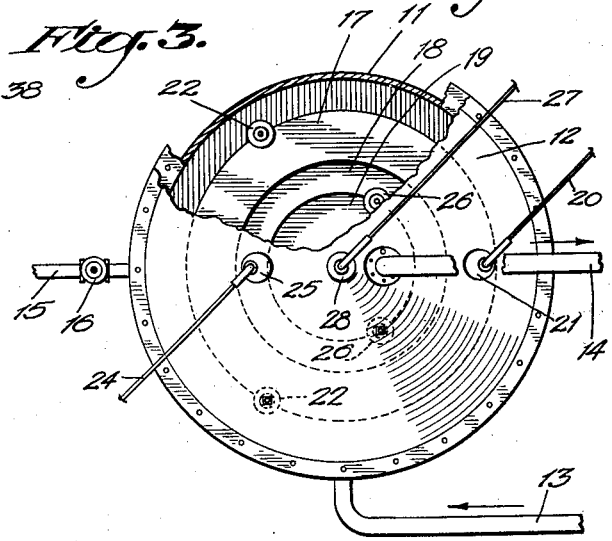
INVENTOR:
Ford W. Harris
by
Fad W. Harris
Attorney Patented Apr. 20, 1926.

1,581,205

UNITED STATES PATENT OFFICE.

FORD W. HARRIS, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA.

PROCESS OF PREVENTING THE PERSISTENCE OF CHAIN FORMATIONS IN AN ELECTRICAL DEHYDRATOR FOR OIL EMULSIONS.

Application filed February 11, 1925. Serial No. 8,409.

*To all whom it may concern:*

Be it known that I, FORD W. HARRIS, a citizen of the United States, residing at Los Angeles, in the county of Los Angeles and State of California, have invented a new and useful Process of Preventing the Persistence of Chain Formations in an Electrical Dehydrator for Oil Emulsions, of which the following is a specification.

It is a well known fact that petroleum emulsions which consist essentially of small particles of water carried in oil may be dehydrated by impressing on the emulsion a high potential electric field which agglomerates the water into larger masses which readily settle out by gravity if allowed to stand. It is also a well known fact that under certain conditions, water chains tend to form between the electrodes of the high potential field and that such chains may form in such numbers as to substantially short circuit that field and, therefore, render the field substantially of no effect.

I have discovered that it is essential to the success of such a dehydrator that electrically conducting chains of water particles be formed in the high potential field, and that the actual agglomeration of the water particles is due to such formation. I have also discovered that such chains must be broken almost as soon as formed, and that when an electrical dehydrator is operating properly, conducting chains are continually being formed and broken. The breaking of such chains in such a dehydrator is due to the fact that they are conducting chains, made up of successive particles of very small mass so that the chain responds very rapidly to any magnetic influence to which it is subjected. Due to the successive formation of such chains, there always exists in the high potential field a sufficient number of such chains to produce an accompanying magnetic field, which tends to force all chains into the electrical center of the whole electrical field. As a result, the water particles are acted upon by a force which tends to force them together substantially along a line at right angles to the direction of chain formation. This can be readily understood when it is considered that conductors, which are substantially parallel and which carry current in the same direction, tend to attract each other and that the conducting chains when formed do not differ in this respect from any other conductor. Two such conducting chains passing through an emulsion parallel to each other would, therefore, tend to coalesce due to their mutual magnetic attraction for each other, and a series of such conducting chains grouped around a copper wire carrying a current in the same direction would tend to approach and eventually touch that wire. In fact, it is probable that electrical dehydration of emulsions is nothing more than the gathering of very fine conducting chains into larger chains, which are broken thermally by local overheating at their thinner portions.

While it is possible to introduce into the electric field of dehydrators conducting wires which will serve as gathering points for the chains, it is much easier to produce in the emulsion chains which may themselves be more or less permanent and which act as gathering centers for fine chains produced by the field itself. In the accompanying drawing I show an arrangement which may be used for this purpose. In that drawing, Fig. 1 is a side elevation partly in section of a dehydrator capable of carrying on my new process.

Fig. 2 is a plan view showing the arrangement of insulators therein.

Fig. 3 is a view showing the manner of electrically connecting the apparatus, and Fig. 4 is a diagram showing the probable mode of chain formation.

In the form of apparatus shown in the drawing I provide a tank 11, preferably having a coned top 12. Emulsion is admitted through a pipe 13 and clean oil is taken out through a pipe 14, water being withdrawn through a water bleeder pipe 15 having a valve 16. Suspended in the tank 11 are three electrodes, a primary electrode 17, a secondary electrode 18 and a tertiary electrode 19. The primary electrode 17 which is of annular form is supported from a conductor 20, passing through the center of an insulator 21 which insulates it from the top 12, and by two strain insulators 22 inside the tank 11. The secondary electrode 18 which is also of annular form is supported by a conductor 24 passing through the center of an insulator 25 which insulates it from the top 12, and by two strain insulators 26 inside the tank 11. The tertiary electrode 19 which is disc shaped is suspended by a conductor 27 which passes through the center of an insulator 28 by which it is insulated from the top 12. The conductor 27 being central will be sufficient to support the electrode 19. All of the conductors are insulated from the point where they leave their respective electrodes until they emerge from the tank 11.

While I have shown three electrodes, two may be used or four or more, although I do not consider that the greater number is advisable on account of the complication. In any event, each electrode is one terminal of an electric field, each of the three electric fields employed in the apparatus illustrated being energized by a separate transformer. The primary field is formed between the edge of the primary electrode 17 and the inner wall of the metal tank 11. This field is established by a secondary winding 30 of a transformer having a primary winding 31 which is fed directly from service lines 32 and 33. The secondary field is formed between the outer edge of the secondary electrode 18 and the tank 11 and is fed by a secondary winding 35 of a transformer having a primary winding 36 which is fed directly from service lines 32 and 33. The tertiary field is formed between the outer edge of the tertiary electrode 19 and the inner wall of the tank 11 and is fed by the secondary winding 37 of a transformer having a primary winding 38 which is fed directly by service lines 32 and 33. The three fields are thus independently excited. The three transformers are preferably so constructed that there is sufficient magnetic leakage between the primary and the secondary to allow the secondary to be permanently short circuited without injury to the transformer.

The method of operation of the invention is as follows: Emulsion is admitted through the pipe 13 to the tank 11 and rises into the space around the edges of the three electrodes 17, 18 and 19, passing successively through the tertiary, the secondary, and the primary electric fields. The voltage impressed upon the three fields may be successively greater as the emulsion rises, the lower or tertiary field having a normal voltage of say 2,500 volts, the secondary field a voltage of 4,000 volts, and the primary field a voltage of 10,000 volts. It is an apparent paradox, but an established fact, that the higher the voltage impressed, the harder it is to form permanent short circuiting chains. As a result, in many types of emulsion, the lower or tertiary field is immediately short circuited by the formation of innumerable chains, each of which carries a very small amount of current, but which taken all together on account of their large number form a very low resistance path between the tertiary electrode and the wall of the tank 11. The short circuiting of the lower or tertiary field does not necessarily affect the secondary and primary fields which are excited by their own individual transformers. The formation of a high current low voltage path in the tertiary field sets up a considerable magnetic field which extends upwardly into the space occupied by the secondary field and tends to pull downwardly any chains formed therein. The result is that the tertiary field once being short circuited acts as a means for pulling violently downwardly any chains formed on the secondary field. This may be seen in Fig. 4 in which the tertiary electrode 19 is shown with small conducting chains formed between the edge thereof and the tank 11. These chains may be substantially permanent and may be of sufficient number to substantially short circuit this field so that the voltage across it is very low. If now a chain starts to form in the secondary field between the edge of the secondary electrode and the tank 11, as shown at 50, this new chain, as soon as it is formed and a current passes therethrough, is pulled down in the direction of the arrow 52 due to the magnetic attraction of the combined chains 51. The chains 50 are, therefore, broken as fast as formed, thus preventing the short circuiting of the secondary field. Should the secondary field become short circuited, the primary field will still be effective and will be acted upon magnetically by the combined pull of both the tertiary and the primary fields.

By my invention it is possible to maintain in a single tank in close relation to each other chains which are established and which are carrying considerable current, and chains which are set up by a high voltage and which are magnetically broken by the established chains. I am also able to use the downward magnetic pull of the established chains to pull the water in coalesced form into the lower field and gradually to separate out from the emulsion all the water particles.

I claim as my invention:

1. A process of dehydrating petroleum emulsions which comprises: establishing a high potential electrical field in a body of said emulsion so that there is a tendency for conducting chains to be formed in said field; and superimposing upon said electrical field a magnetic field formed by secondary conducting chains through said emulsion, said secondary chains being so formed that they do not impair the potential of said high potential electric field.

2. A process of preventing chain formation in the high potential field of an electrical dehydrator which comprises: forming contiguous to said high potential field conducting chains which tend to magnetically tear apart incipient chains in said high potential field, said conducting chain being formed in an electric field independent of said high potential field.

3. A process of preventing the persistence of conducting chains in the high potential field of an electrical dehydrator which comprises: causing a current flow independent of said high potential field and along a path substantially parallel to the natural path for the formation of said chains.

4. A process of preventing the persistence of conducting chains in the high potential field of an electrical dehydrator which comprises: forming conducting paths parallel to the natural direction of said conducting chains, said conducting paths being formed from the conducting particles in the emulsion to be treated; and causing a current to flow along said paths from a potential independent of that of said high potential field.

5. A process of preventing the formation of electrically conducting chains in the field of an electrical dehydrator for petroleum emulsions which comprises: impressing upon said emulsion an independent electrical field under such conditions as to promote the formation of heavy conducting chains in such a position that they tend to magnetically rupture the chains forming in the high potential field.

In testimony whereof, I have hereunto set my hand at Los Angeles, California, this 5th day of February, 1925.

FORD W. HARRIS.